(12) United States Patent
Jenkins et al.

(10) Patent No.: US 10,365,536 B1
(45) Date of Patent: Jul. 30, 2019

(54) OPTICAL DEVICE INCLUDING A MONOLITHIC BODY OF OPTICAL MATERIAL AND RELATED METHODS

(71) Applicant: EAGLE TECHNOLOGY, LLC, Melbourne, FL (US)

(72) Inventors: Micah H. Jenkins, Palm Bay, FL (US); Christopher J. Carron, West Melbourne, FL (US); Charles F. Middleton, Rockledge, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 15/890,605

(22) Filed: Feb. 7, 2018

(51) Int. Cl.
*G02F 1/29* (2006.01)
*G02F 1/295* (2006.01)
*G01S 7/481* (2006.01)
*G01S 17/02* (2006.01)

(52) U.S. Cl.
CPC .......... *G02F 1/2955* (2013.01); *G01S 7/4811* (2013.01); *G01S 17/02* (2013.01); *G02F 2201/06* (2013.01); *G02F 2202/20* (2013.01)

(58) Field of Classification Search
CPC .............. G02F 1/2955; G02F 2201/06; G02F 2202/20; G01S 7/4811; G01S 17/02
USPC ............................................................ 385/8
See application file for complete search history.

(56) References Cited

U.S. PATENT DOCUMENTS

| 5,233,673 | A | 8/1993 | Vali et al. | |
|---|---|---|---|---|
| 6,374,000 | B1* | 4/2002 | Olesen | G02F 1/0123 385/2 |
| 6,573,026 | B1 | 6/2003 | Aitken et al. | |
| 6,597,836 | B2 | 7/2003 | Johnson et al. | |
| 7,095,925 | B2* | 8/2006 | Grunnet-Jepson | G02B 6/2861 250/231.14 |
| 8,988,754 | B2 | 3/2015 | Sun et al. | |
| 9,476,981 | B2 | 10/2016 | Yaacobi et al. | |
| 2004/0001659 | A1* | 1/2004 | Samara-Rubio | G02F 1/025 385/3 |
| 2004/0165808 | A1* | 8/2004 | Lauzon | G02B 6/126 385/11 |
| 2009/0310906 | A1* | 12/2009 | Miyatake | G02B 6/125 385/14 |

(Continued)

OTHER PUBLICATIONS

Guan et al. "Hybrid 3Dphotonic integrated circuit for optical phased array beam steering" 2015 Optical Society of America; pp. 2.

(Continued)

*Primary Examiner* — Jerry M Blevins
(74) *Attorney, Agent, or Firm* — Allen, Dyer, Doppelt, + Gilchrist, P.A.

(57) ABSTRACT

An optical device may include a monolithic body of optical material including an optical signal port, an optical coupler/splitter portion including a plurality of optical couplers/splitters arranged in a planar configuration and coupled to the optical signal port, and a phase modulation portion including a plurality of phase shifters arranged in a planar configuration and coupled to respective ones of the plurality of optical couplers/splitters. The monolithic body may also include a fanning-array portion including a plurality of optical waveguides extending from the phase modulation portion in a planar configuration and fanning to a two-dimensional array on an edge of the monolithic body.

24 Claims, 13 Drawing Sheets

(56) References Cited

U.S. PATENT DOCUMENTS

| | | | |
|---|---|---|---|
| 2010/0196005 A1* | 8/2010 | Wada | G02B 6/12019 398/45 |
| 2012/0050744 A1* | 3/2012 | Takada | G01J 3/45 356/451 |
| 2014/0313560 A1 | 10/2014 | Shaddock | |
| 2015/0293224 A1 | 10/2015 | Eldada et al. | |
| 2015/0378241 A1 | 12/2015 | Eldada | |
| 2016/0049765 A1 | 2/2016 | Eldada | |
| 2017/0146639 A1* | 5/2017 | Carothers | G01S 7/484 |

OTHER PUBLICATIONS

Neil Savage "Phased-Array Antennas for Light Nano-optical array promises electronically steered light beams" https://spectrum.ieee.org/semiconductors/optoelectronics/phasedarray-antennas-for-light; Jan. 9, 2013pp. 1.

Yoo et al. "Heterogeneous 2D/3D photonic integrated microsystems" Microsystems & Nanoengineering 2, http://www.nature.com/articles/micronano201630: Aug. 1, 2016 pp. 9.

http://www.optoscribe.com/ retreived from internet Jan. 24, 2018; pp. 5.

Sun et al. "Large-scale nanophotonic phased array" Nature: vol. 493: Jan. 10, 2013 pp. 195-199.

\* cited by examiner

OPTICAL DEVICE INCLUDING A MONOLITHIC BODY OF OPTICAL MATERIAL AND RELATED METHODS

TECHNICAL FIELD

The present invention relates to sensing and communications systems, and more particularly, to optical devices for sensing and communication applications and related methods.

BACKGROUND

Radio frequency (RF) phased arrays are widely used for both government and commercial systems. The array of antennas creates a steerable beam of RF waves that may be electronically controlled to point in different directions without having to physically move the antennas. By way of example, RF phased array systems may be used in numerous applications such as radars, acoustic/sonar, imaging, seismology, etc.

Optical phased array devices are similar to RF phased arrays in that they provide for an electronically steerable beam, but in optical phased arrays the beam is made up of light waves instead of RF signals. Yet, a significant challenge of optical phased arrays is size constraints. That is, because of the wavelengths of light involved, the requisite spacing between optical emitters is relatively small (i.e., microscopic). As a result, there are significant fabrication challenges to implementing relatively large scale optical phased array devices.

One example optical phase array configuration is set forth in U.S. Pat. No. 8,988,754 to Sun et al. This patent discloses an optical phased array formed of a large number of nanophotonic antenna elements, which may be used to project complex images into the far field. These nanophotonic phased arrays, including the nanophotonic antenna elements and waveguides, are formed on a single chip of silicon using complementary metal-oxide-semiconductor (CMOS) processes. Directional couplers evanescently couple light from the waveguides to the nanophotonic antenna elements, which emit the light as beams with phases and amplitudes selected so that the emitted beams interfere in the far field to produce the desired pattern. In some cases, each antenna in the phased array may be optically coupled to a corresponding variable delay line, such as a thermo-optically tuned waveguide or a liquid-filled cell, which are used to vary the phase of the antenna's output (and the resulting far-field interference pattern).

Another example configuration is set forth in Guan et al., "Hybrid 3D Photonic Integrated Circuit for Optical Phased Array Beam Steering," CLEO, 2015. This reference discloses a hybrid integrated optical phased array (OPA) based on a 2D photonic integrated circuit and 3D waveguides. The 4×4 OPA supports 4.93° horizontal and vertical beam steering near 1550 nm with 7.1 dB loss.

Despite the existence of such systems, further developments in optical phased array devices may be desirable in certain applications.

SUMMARY

An optical device may include a monolithic body of optical material including an optical signal port, an optical coupler/splitter portion including a plurality of optical couplers/splitters arranged in a planar configuration and coupled to the optical signal port, and a phase modulation portion including a plurality of phase shifters arranged in a planar configuration and coupled to respective ones of the plurality of optical couplers/splitters. The monolithic body may also include a fanning-array portion including a plurality of optical waveguides extending from the phase modulation portion in a planar configuration and fanning to a two-dimensional array on an edge of the monolithic body.

In accordance with one example implementation, the phase shifters may comprise micro-heater elements. In accordance with another example embodiment, the phase shifters may comprise integrated Lithium Niobate phase modulators. The phase modulation portion may also include at least one amplitude control element in some embodiments. By way of example, the at least one amplitude control element may comprise a Mach-Zehnder modulator.

In addition, the monolithic body may define recesses between the phase shifters within the phase modulation portion. Moreover, the monolithic body may also define recesses beneath the phase shifters within the phase modulation portion. In accordance with one example implementation, the optical device may further include LIDAR circuitry coupled to the optical signal port. By way of example, the optical material may comprise fused silica. Additionally, an integrated control circuit may be carried by the monolithic body and coupled to the phase shifters.

A related method is for making an optical device from a monolithic body of optical material. The method may include forming an optical signal port in the monolithic body, forming an optical coupler/splitter portion in the monolithic body including a plurality of optical couplers/splitters arranged in a planar configuration and coupled to the optical signal port, and forming a phase modulation portion in the monolithic body including a plurality of phase shifters arranged in a planar configuration and coupled to respective ones of the plurality of optical couplers/splitters. The method may also include forming a fanning-array portion in the monolithic body including a plurality of optical waveguides extending from the phase modulation portion in a planar configuration and fanning to a two-dimensional array on an edge of the monolithic body. In accordance with one example implementation, the optical signal portion, optical coupler/splitter, phase modulation portion, and fanning-array may be formed in the monolithic body using a femtosecond laser direct writing process.

Another related optical device may include a monolithic body of optical material including an optical signal port, and a phase modulation portion including a plurality of phase shifters arranged in a planar configuration. The monolithic body may also include a first fanning-array portion including a plurality of optical waveguides extending from a first end of the phase modulation portion in a planar configuration and fanning to a two-dimensional array on a first edge of the monolithic body. The monolithic body may also include a second fanning-array portion including a plurality of optical waveguides extending from a second end of the phase modulation portion in a planar configuration and fanning to a two-dimensional array on a second edge of the monolithic body opposite the first edge.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation and multiple prime notation are used to indicate similar elements in different embodiments.

Figure 1:
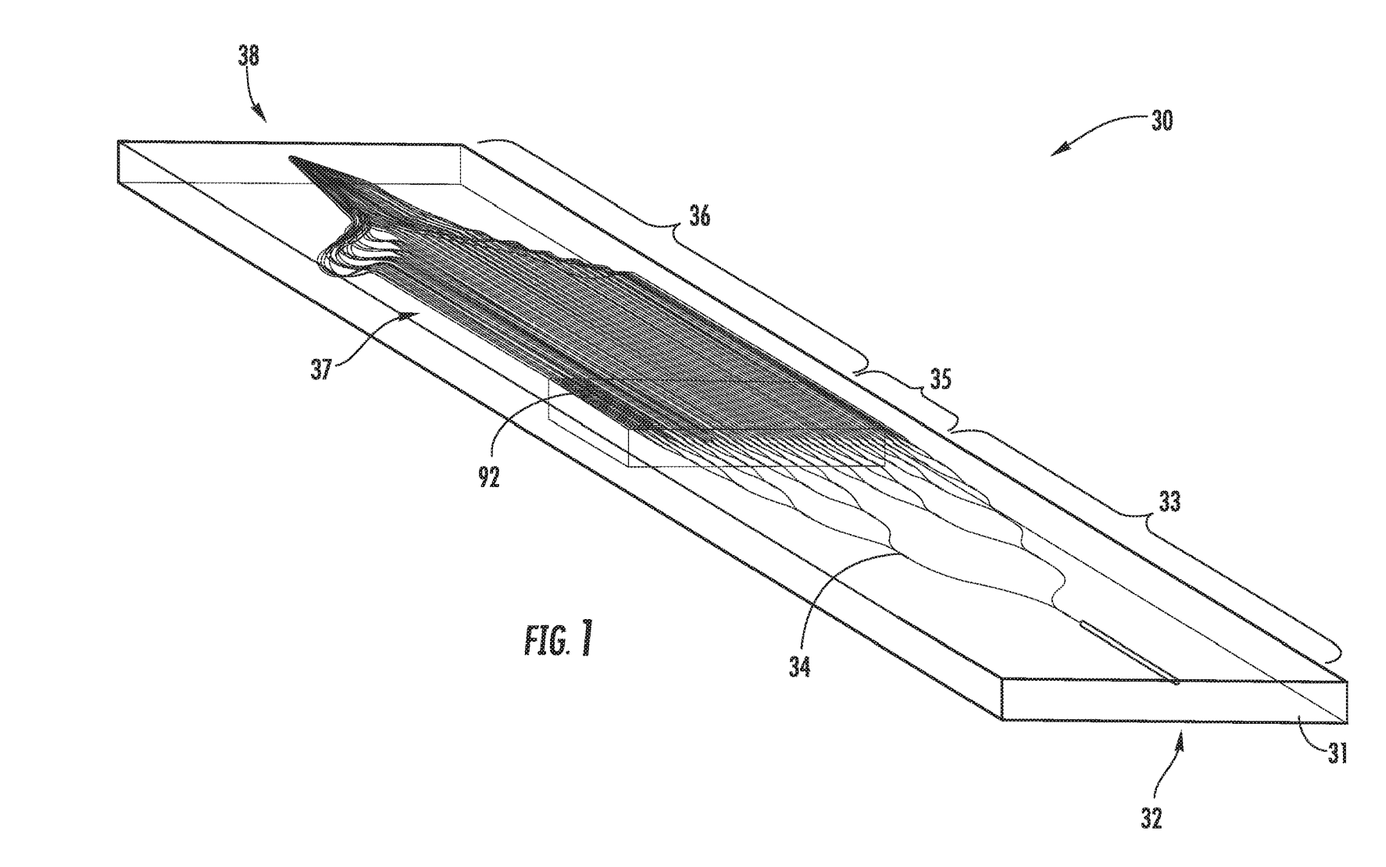
FIG. 1 is a perspective view of an optical device in accordance with an example embodiment formed out of a monolithic body of optical material.

Referring initially to FIG. 1, an optical device 30 that is formed out of a monolithic body 31 of optical material is first described. By way of example, the optical material may be fused silica, although other suitable optical materials may be used in different embodiments. The optical device 30 illustratively includes an optical signal port 32, and an optical coupler/splitter portion 33 including a plurality of optical couplers/splitters 34 arranged in a planar configuration and coupled to the optical signal port. By way of example, the optical couples/splitters 34 may be implemented using multimode interference (MMI) and/or directional couplers. The optical couples/splitters 34 will couple or split light depending on which way the light is traveling through the body 31.

The device 30 also illustratively includes a phase modulation portion 35 including a plurality of phase shifters (which will be discussed further below) arranged in a planar configuration and coupled to respective ones of the plurality of optical couplers/splitters 34. In the illustrated example, a single optical signal port 32 is used, but it will be appreciated that in other embodiments separate optical signal ports may be used for routing different light paths into or out of the body 31.

The device 30 further illustratively includes a fanning-array portion 36 including a plurality of optical waveguides 37 extending from the phase modulation portion 35 in a planar configuration and fanning to a two-dimensional array 38 on an edge of the monolithic body. In particular, all of the above-described components are formed or integrated within the same common monolithic body 31 as shown. In the illustrated example, a control circuit 92 (e.g., an integrated circuit such as a microprocessor) is carried by the monolithic body 31 and coupled to the phase shifters to control phase and/or amplitude changes, as will be discussed further below. However, the phase control circuitry need not be carried by the monolithic body 31 in all embodiments.

Figure 2:
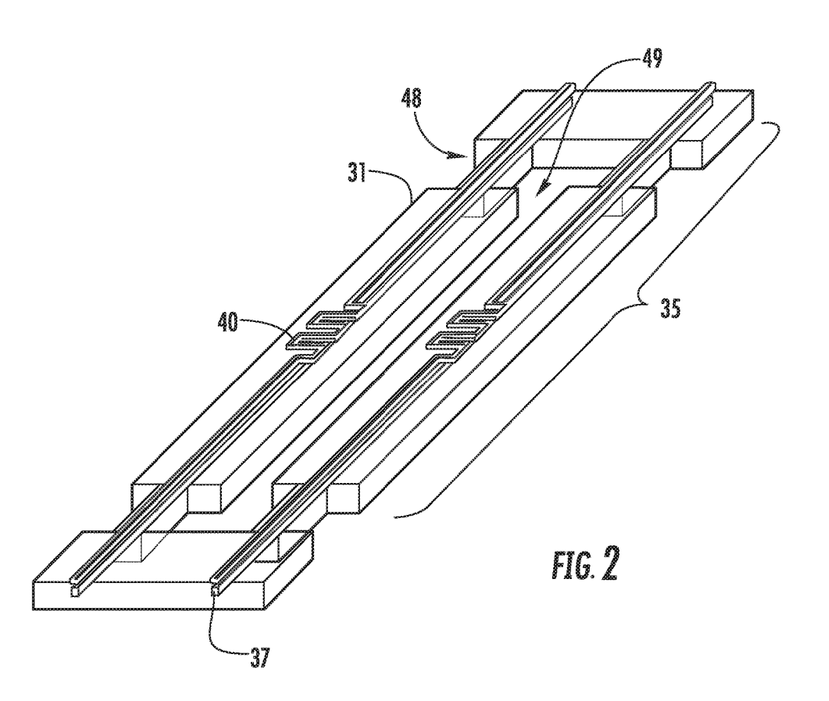
FIG. 2 is a perspective view of an example micro-heater phase shifter configuration which may be used in a phase modulation portion of the optical device of FIG. 1.
Figure 3:
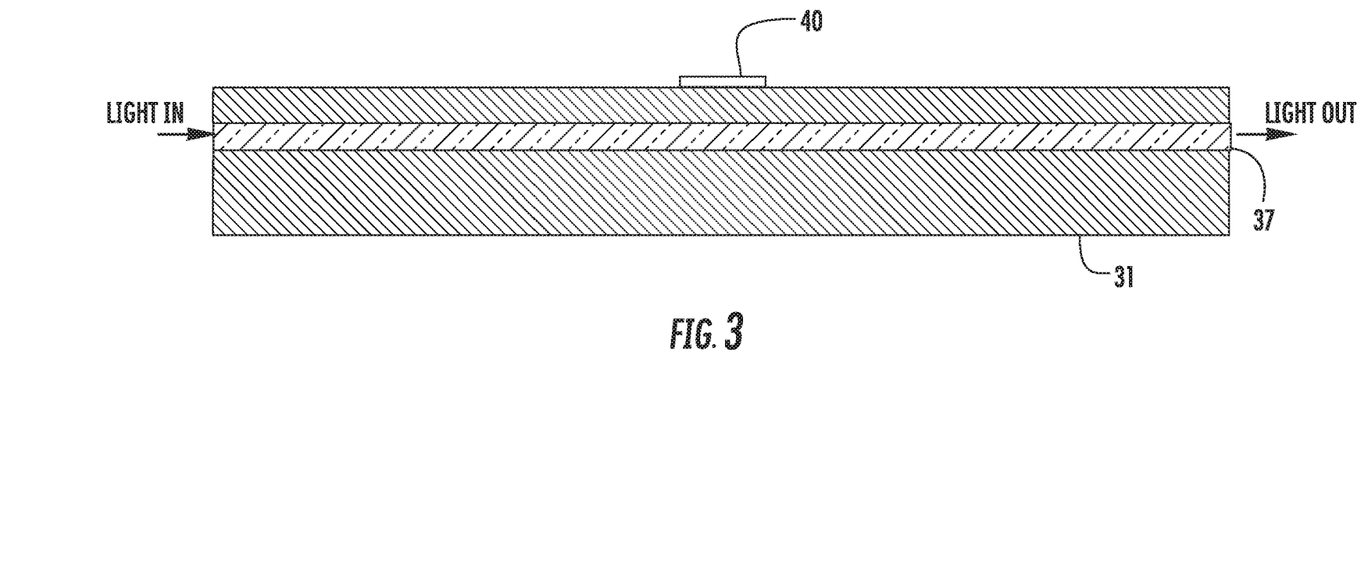
FIG. 3 is a side view of a micro-heater element of FIG. 2.

Referring additionally to FIGS. 2-3, in accordance with one example implementation the phase shifters may take the form of micro-heater elements 40 which in the illustrated configuration overlie respective waveguides 37. The embodiment illustrated in FIG. 2 is a suspended micro-heater array configuration, in which spaces or recesses 48, 49 are respectively etched below and between each of the waveguides 37 (and, accordingly, between the micro-heater elements 40 as well). This advantageously helps provide thermal insulation between the waveguides 37 to allow for more precise control of the waveguide temperatures and, accordingly, the respective phases of light traveling through each of these waveguides. In one example configuration, the resistive micro-heater elements 40 may heat the respective waveguides 37 up to approximately 80° C. by dissipating ~200 μW in each resistor, which produces $\Delta\theta=4\pi$.

By way of example, the resistive micro-heater elements 40 may be patterned directly onto the fused silica monolithic body 31, as will be discussed further below. The relative phase delay through the waveguide 37 is proportional to $$\theta \propto \frac{2\pi}{\lambda} dndT \int_0^L \Delta T(z)dz,$$

where $\Delta T(z)$ is the thermal rise profile along the waveguide resulting from a resistive micro heater.

Figure 4:
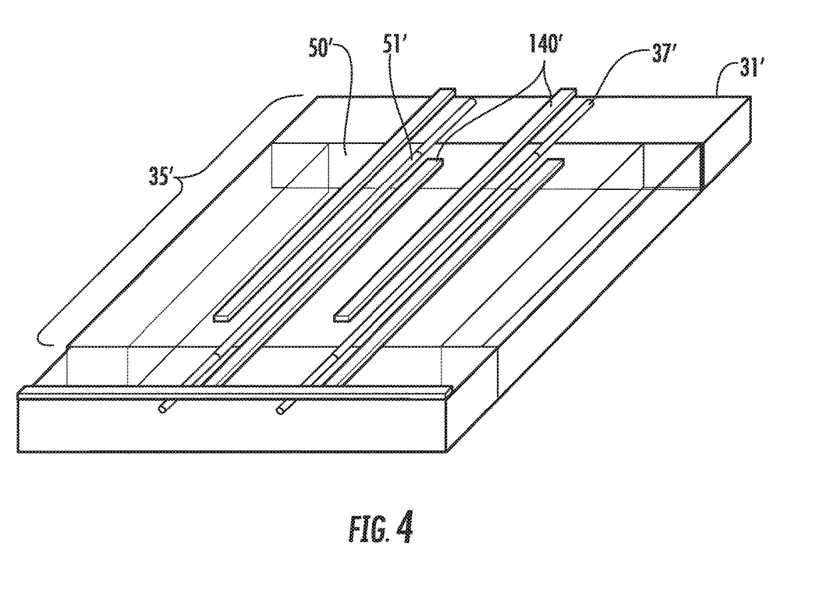
FIGS. 4 and 5 are perspective views of an example integrated Lithium Niobate phase modulator configuration which may be used in the phase modulation portion of the optical device of FIG. 1.
Figure 5:
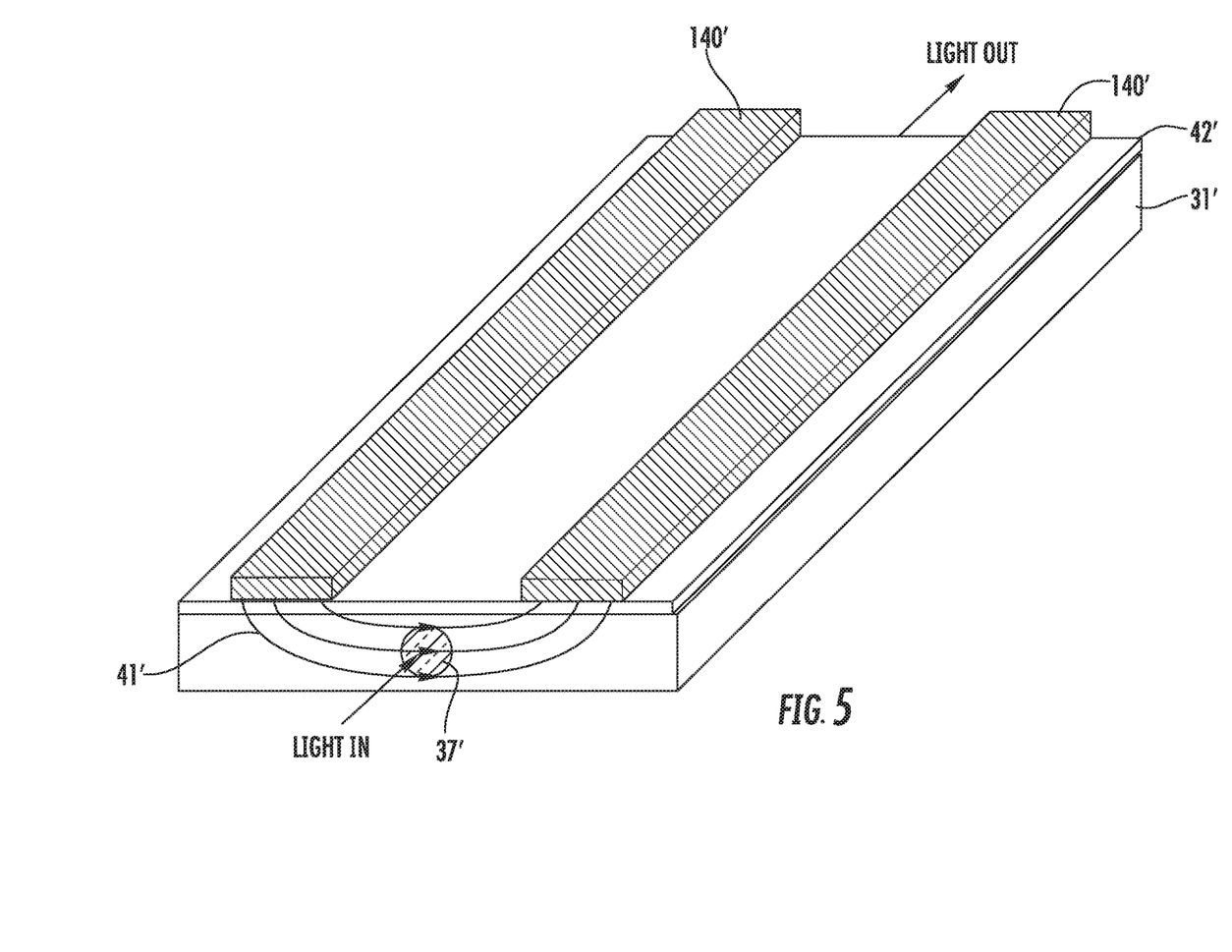

In accordance with another example embodiment now described with reference to FIGS. 4 and 5, the phase shifters may also be implemented using electrodes 140' patterned on an integrated electro-optic material, such as Lithium Niobate (LiNbO$_3$) 50. In the illustrated example, a respective pair of electrodes 140' is positioned adjacent each waveguide 37' within the phase modulation portion 35' of the body 31', with the waveguide being positioned between or in the middle of its respective pair of electrodes. It should be noted that in other embodiments, different electro-optic materials may be used, if desired. The illustrated example of FIG. 5 demonstrates how an electric field (represented by lines 41') created by the electrodes 140' passes through the respective waveguide 37' to alter the phase of light passing therethrough. In one example embodiment, the waveguide in the electro-optic material 50 may be fabricated via ion-beam implantation prior to integration within monolithic body 31'. The recess in the monolithic body 31' can be defined via femtosecond laser processing prior to inserting the electro-optic material 50 and patterning the electrodes 140'.

In accordance with one example implementation, the LiNbO$_3$ material 50 and embedded waveguides 51' may be fabricated separately and integrated into the fused silica body 31' via defined sockets created during patterning of the optical device, such as with a femtosecond laser process, as will be discussed further below. In the illustrated example, the relative phase delay through the embedded waveguide 51' is proportional to $$\theta \propto \frac{2\pi}{\lambda} r \int_0^L E(z)dz,$$

where E(z) is the electric field profile along the embedded waveguide 51' resulting from the electrodes 140' and r is relevant electro-optic coefficient. In the present example, an optional insulating buffer layer 42' (e.g., $SiO_2$) is provided between the body 31' and the electrodes 140'.

Figure 6A:
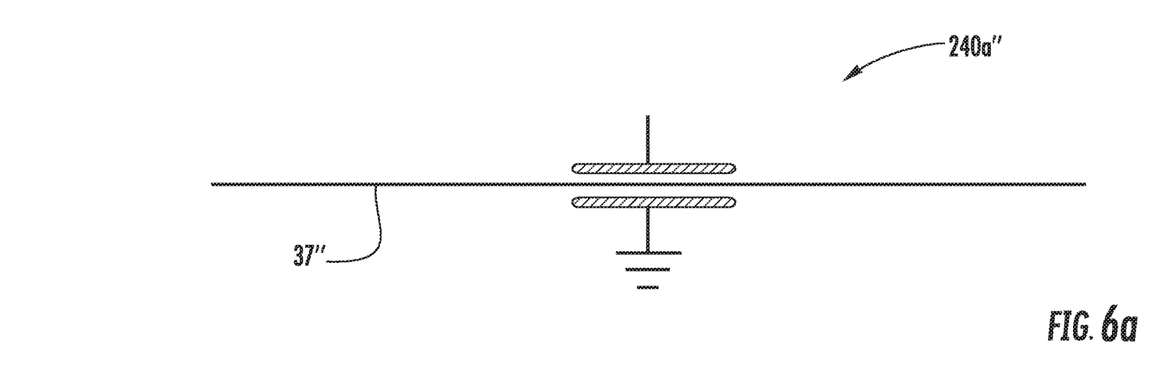
FIGS. 6a and 6b are equivalent schematic circuit diagrams of a phase shifter and a Mach-Zehnder modulator (MZM) amplitude control configuration which may be used in the phase modulation portion of the optical device of FIG. 1.
Figure 6B:
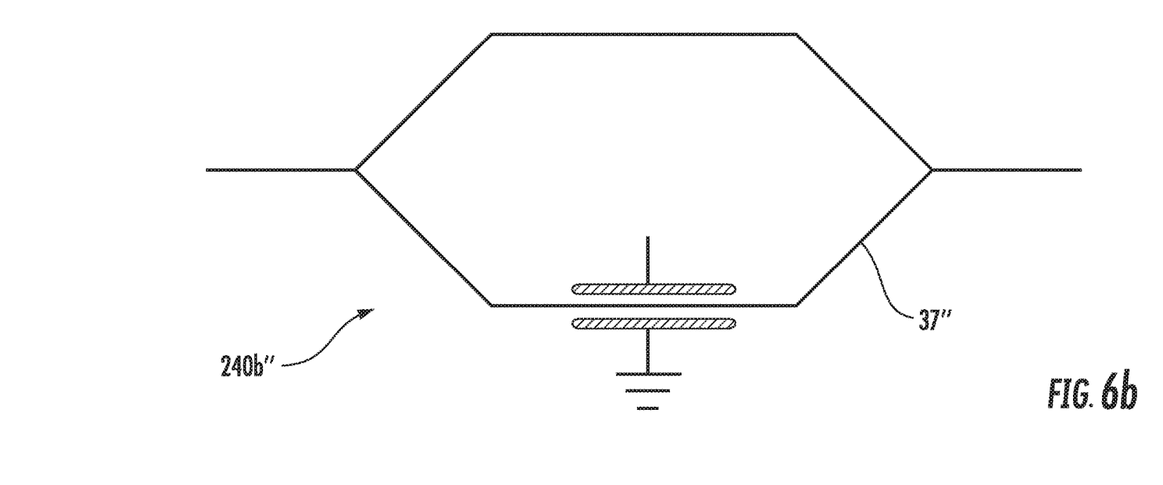

Still another example configuration of phase shifter and amplitude control elements 240a'' and 240b'' are now described with reference to the schematic diagrams of FIGS. 6a and 6b, respectively. More particularly, the first element 240a'' is a phase modulator element coupled to a respective waveguide 37''. In addition to (or instead of) a phase control element 240a'', a Mach-Zehnder modulator (MZM) amplitude control element 240b'' may also be included within the phase modulation portion. Both amplitude and phase control may be derived from controlling the relative optical path length (OPL=nL) through a waveguide 37''. Where amplitude and phase control are used, the MZM amplitude control element 240b'' may be coupled in series with the phase control element 240a'', for example.

Figure 7:
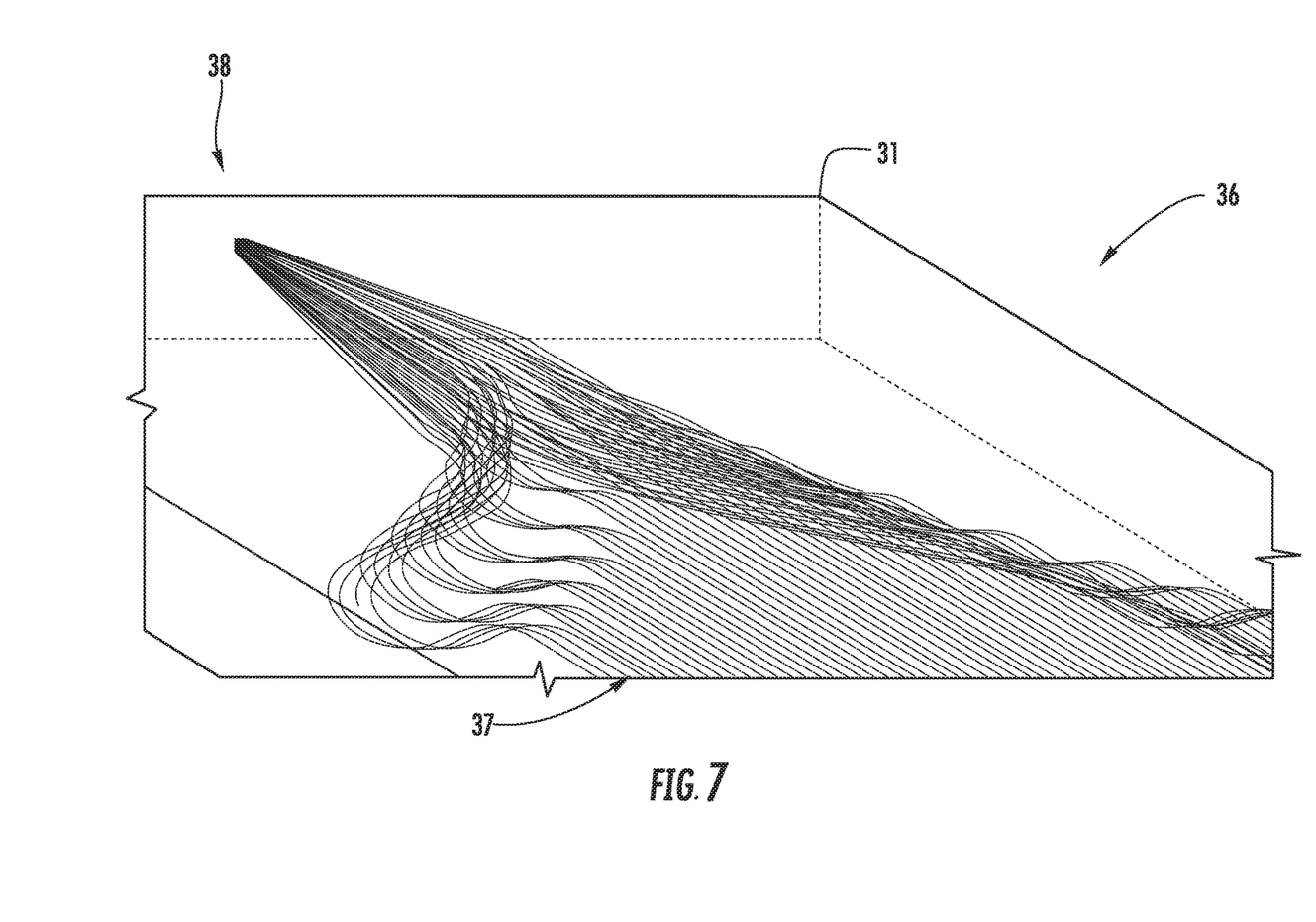
FIG. 7 is a perspective view of a fanning-array portion of the optical device of FIG. 1 shown in greater detail.
Figure 8:
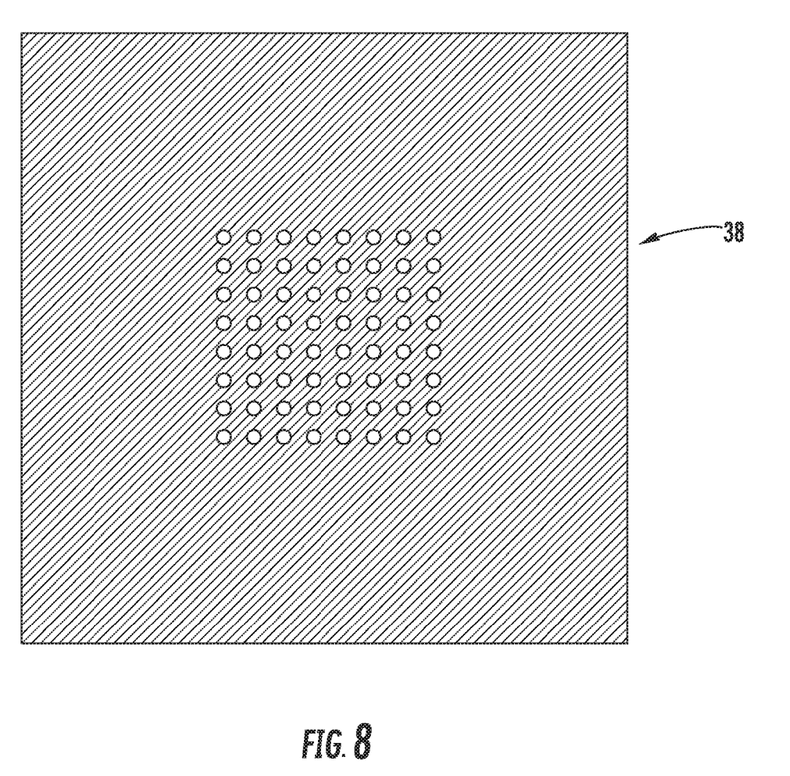
FIG. 8 is an end view of a two-dimensional array defined by the optical waveguides within the fanning-array portion of FIG. 7 at an edge of the monolithic body.

A close-up view of the fanning-array portion 36 and the two-dimensional array 38 are shown in FIGS. 7 and 8, respectively. In the fanning-array portion 26, the waveguides 37 which are planar or in 1D at the phase modulation portion 35 are transitioned or fanned into the two-dimensional array 38 at an end of the body 31 as shown. It will be appreciated that other fanning geometries beside that which is illustrated in the example implementation may also be used in different embodiments. The two-dimensional array 38 illustrated in FIG. 8 is an 8×8 array, although other sizes of arrays may be used in different embodiments. In the illustrated example, the optical modeling demonstrates a uniform array intensity, as will be appreciated by those skilled in the art. In some embodiments, an integrated 90-degree bend in the waveguides may advantageously be enabled by integrating mirrors at 45 degrees using the femtosecond laser processing and subsequent metal deposition/polishing, as will be appreciated by those skilled in the art.

Figure 9:
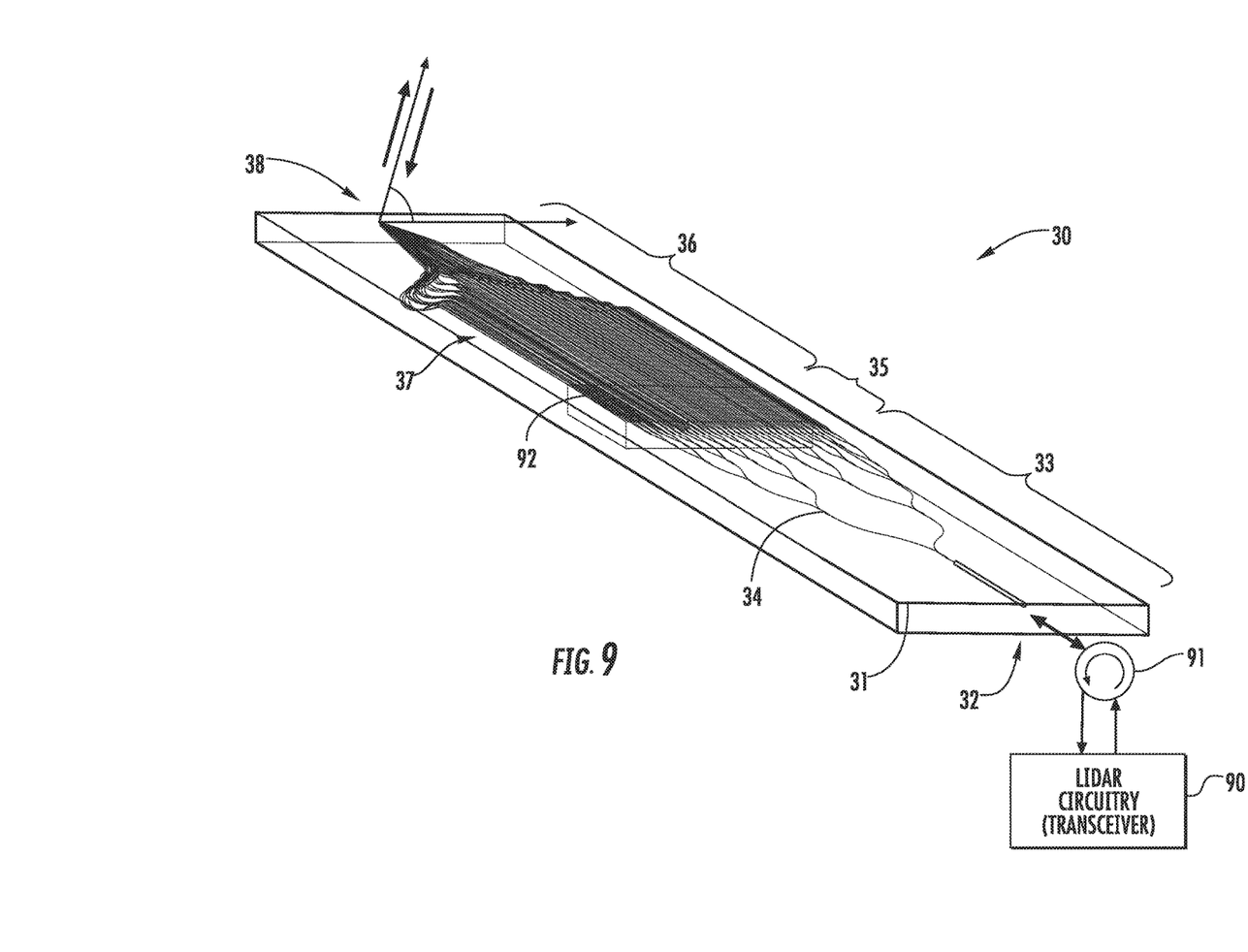
FIG. 9 is a perspective view of the optical device of FIG. 1 used in a LIDAR configuration in accordance with an example embodiment.

Turning now to FIG. 9, in accordance with another example embodiment, the optical device 30 may further include LIDAR circuitry 90 (e.g., including an optical transceiver) coupled to the optical signal port 32, such as by an optical circular 91, for example. In a LIDAR implementation, control phases route incident optical pulses to a specific output direction. This advantageously allows for a steerable output beam over a relatively wide range, e.g., +3.7° for the illustrated example embodiment. Moreover, they also simultaneously route any photons received from the same direction back through the input for detection. Also in the illustrated example, an integrated circuit 92 (e.g., a microprocessor) is carried once again by the by the monolithic body and coupled to the phase shifters for controlling the phase elements to provide the desired phase shifting and/or amplitude.

Figure 10:
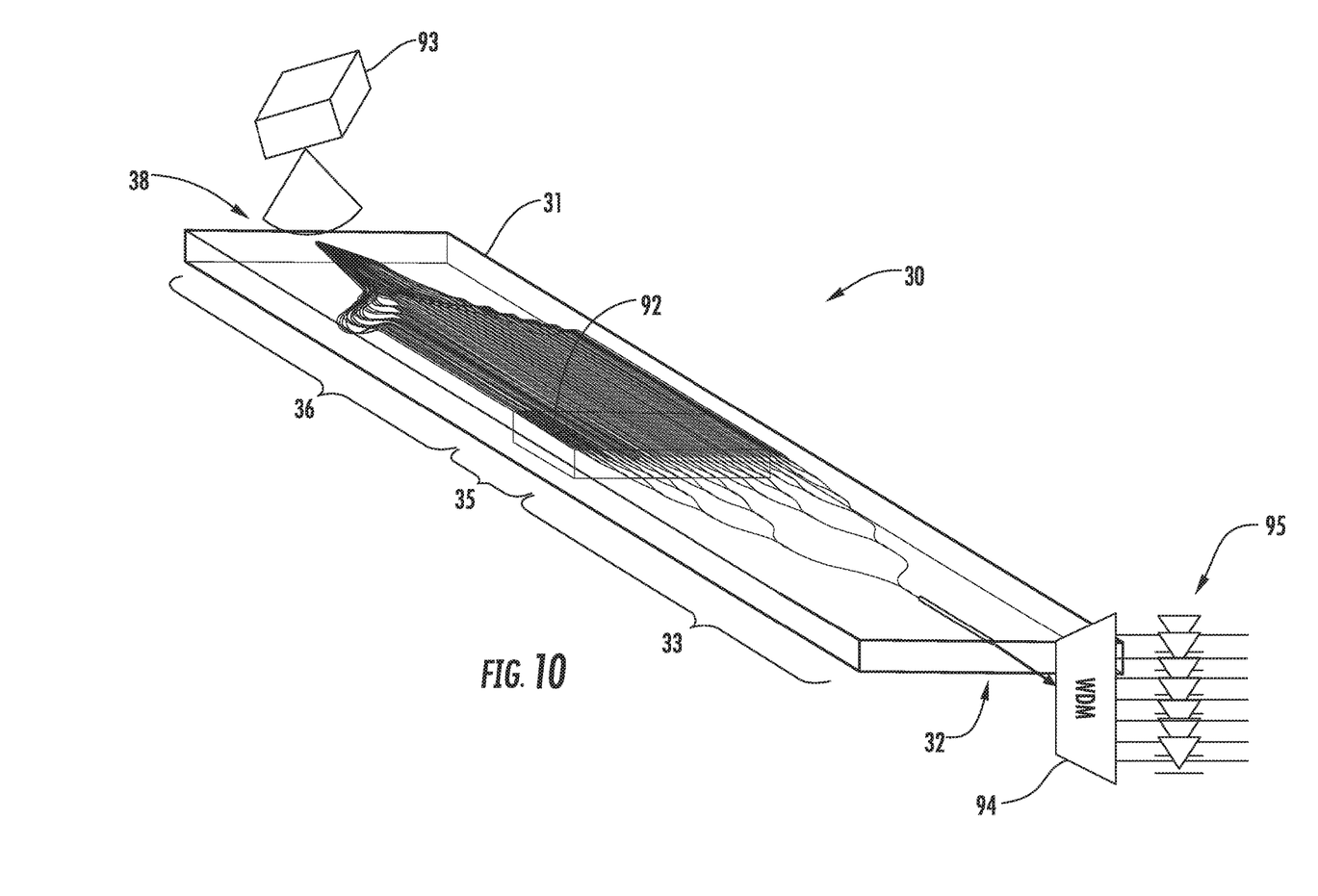
FIG. 10 is a perspective view of the optical device of FIG. 1 used in a lens-less 3D imaging configuration in accordance with an example embodiment.

In accordance with another example implementation shown in FIG. 10, the device 30 may be used to implement a relatively high-speed, lens-less 3D imaging device. For a 3D object 93 in space, a phase front curvature of the 2D array 38 "addresses" a specific point in 3D space. The phase shifters control the phases to "look" for incident radiation from the specific point in the object space. As a result, interference will be "constructive" for the addressed 3D point, and a wave division multiplexer (WDM) 94 and photodiode array 95 may accordingly be coupled to the port 32 to provide a high-speed readout. This advantageously provides for color imaging using wave division multiplexing.

Figure 11:
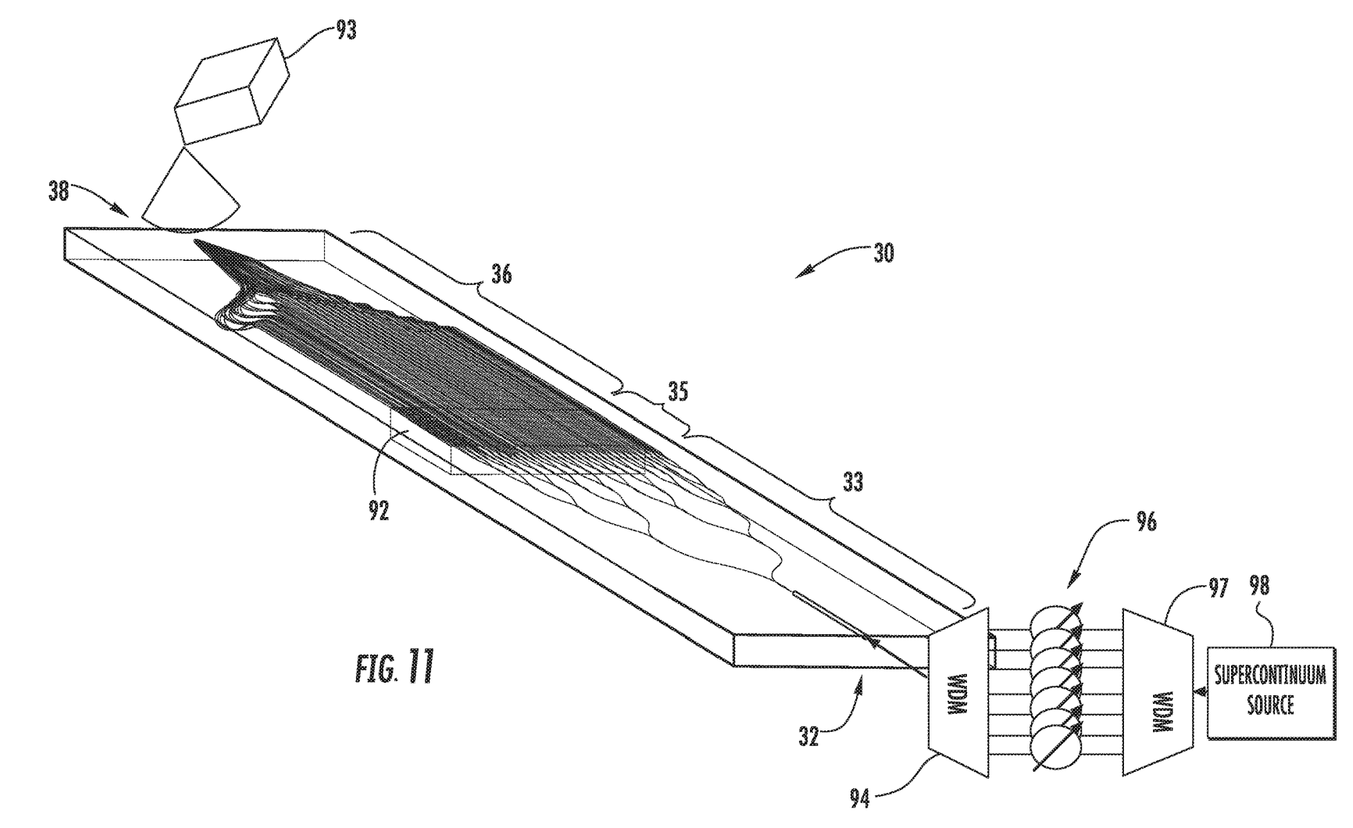
FIG. 11 is a perspective view of the optical device of FIG. 1 used in a 3D light display configuration in accordance with an example embodiment.

Still another example implementation is shown in FIG. 11 for providing a 3D light display. As with the previous example, for a 3D object 93 in space, a phase front curvature of the 2D array 38 "addresses" a specific point in 3D space. The phase shifters control the phases to "route" incidence radiation to a specific point in the image space. A WDM 94, Variable Optical Attenuator (VOA) array 96, and WDM 97 are coupled in series between the port 32 and a supercontinuum source 98.

Figure 12:
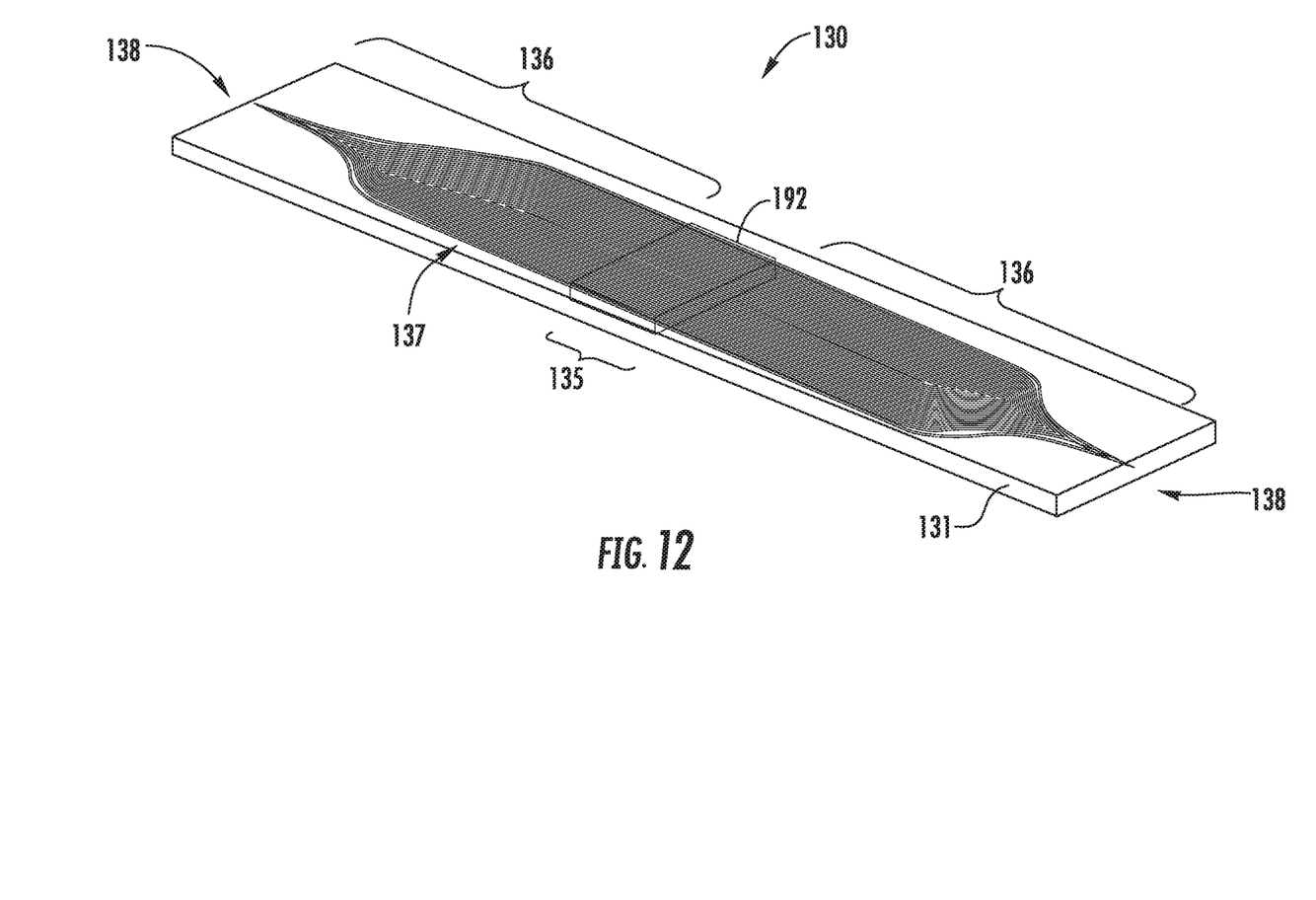
FIG. 12 is a perspective view of another optical device in accordance with an example embodiment formed out of a monolithic body of optical material which may be used as a general high-speed spatial light modulator.

Turning to FIG. 12, still another optical device 130 may similarly be implemented using a monolithic body 131. In the example implementation shown in FIG. 12, the device 130 includes a respective fanning array portion 136 including waveguides 137 at both ends of the body 131 to define a general spatial light modulator. Here, a light field is collected at an input side of the body 131 with a first two-dimensional waveguide array 138, which is then routed to the phase modulation portion 135 including a relatively large pitch 1D array of amplitude and/or phase modulators (such as those described above), and routed back to an output 2D array on the opposite end of the body. A phase control circuit 192 may also be provided, as discussed above.

Figure 13:
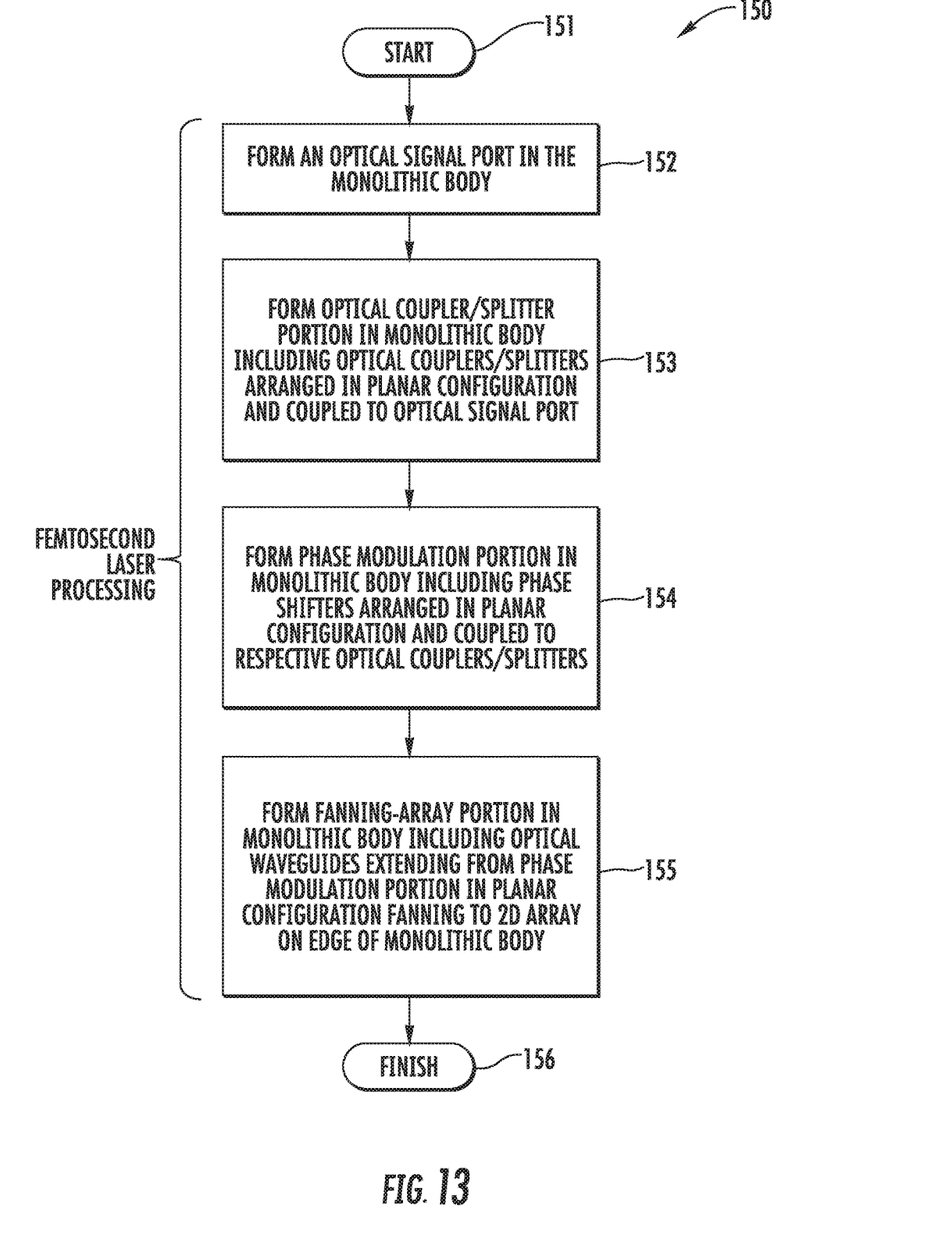
FIG. 13 is a flow diagram illustrating method aspects associated with making an optical device from a monolithic body of optical material in accordance with an example embodiment.

A related method for making the optical device 30 from the monolithic body of optical material 31 is now described with reference to FIG. 13. Beginning at Block 151, the method may include forming an optical signal port 32 in the monolithic body 31 (Block 152), forming an optical coupler/splitter portion 33 in the monolithic body including a plurality of optical couplers/splitters 34 arranged in a planar configuration and coupled to the optical signal port (Block 153), and forming a phase modulation portion 35 in the monolithic body including a plurality of phase shifters arranged in a planar configuration and coupled to respective ones of the plurality of optical couplers/splitters (Block 154). The method may also include forming a fanning-array portion 36 in the monolithic body 31 including a plurality of optical waveguides 37 extending from the phase modulation portion 35 in a planar configuration and fanning to a two-dimensional array 38 on an edge of the monolithic body, at Block 155, which illustratively includes the method of FIG. 13 (Block 156).

The foregoing steps may be performed using a femtosecond laser, and more particularly femtosecond laser direct writing (FLDW) and/or femtosecond laser induced chemical etching (FLICE). Furthermore, certain components of the optical device may be inserted in the monolithic body 31 after patterning with the femtosecond laser (e.g., phase shifter elements and/or waveguide sections, as discussed above). Moreover, the order in which the various portions of the body 31 are formed may be different in different embodiments.

Many modifications and other embodiments will come to the mind of one skilled in the art having the benefit of the teachings presented in the foregoing descriptions and the associated drawings. Therefore, it is understood that the disclosure is not to be limited to the specific embodiments That which is claimed is:

1. An optical device comprising:
a monolithic body of optical material comprising
an optical signal port,
an optical coupler/splitter portion comprising a plurality of optical couplers/splitters arranged in a planar configuration and coupled to the optical signal port,
a phase modulation portion comprising a plurality of phase shifters arranged in a planar configuration and coupled to respective ones of the plurality of optical couplers/splitters, and
a fanning-array portion comprising a plurality of optical waveguides extending from the phase modulation portion in a planar configuration and fanning so that ends of the plurality of optical waveguides terminate to define a two-dimensional array on an edge of the monolithic body.

2. The optical device of claim 1 wherein the phase shifters comprise micro-heater elements.

3. The optical device of claim 1 wherein the phase shifters comprise Lithium Niobate modulators.

4. The optical device of claim 1 wherein the phase modulation portion further comprises at least one amplitude control element.

5. The optical device of claim 4 wherein the at least one amplitude control element comprises a Mach-Zehnder modulator.

6. The optical device of claim 1 wherein the monolithic body defines recesses between the phase shifters within the phase modulation portion.

7. The optical device of claim 1 wherein the monolithic body defines recesses beneath the phase shifters within the phase modulation portion.

8. The optical device of claim 1 further comprising LIDAR circuitry coupled to the optical signal port.

9. The optical device of claim 1 wherein the optical material comprises fused silica.

10. The optical device of claim 1 further comprising an integrated control circuit carried by the monolithic body and coupled to the phase shifters.

11. An optical device comprising:
a monolithic body of optical material comprising
an optical signal port,
an optical coupler/splitter portion comprising a plurality of optical couplers/splitters arranged in a planar configuration and coupled to the optical signal port,
a phase modulation portion comprising a plurality of phase shifters arranged in a planar configuration and coupled to respective ones of the plurality of optical couplers/splitters with recesses between and beneath the phase shifters and the monolithic body, and
a fanning-array portion comprising a plurality of optical waveguides extending from the phase modulation portion in a planar configuration and fanning to a two-dimensional array on an edge of the monolithic body.

12. The optical device of claim 11 wherein the phase shifters comprise micro-heater elements.

13. The optical device of claim 11 wherein the phase shifters comprise Lithium Niobate electrodes.

14. The optical device of claim 11 wherein the phase modulation portion further comprises at least one amplitude control element.

15. The optical device of claim 14 wherein the at least one amplitude control element comprises a Mach-Zehnder modulator.

16. A method for making an optical device from a monolithic body of optical material and comprising:
forming an optical signal port in the monolithic body;
forming an optical coupler/splitter portion in the monolithic body comprising a plurality of optical couplers/splitters arranged in a planar configuration and coupled to the optical signal port;
forming a phase modulation portion in the monolithic body comprising a plurality of phase shifters arranged in a planar configuration and coupled to respective ones of the plurality of optical couplers/splitters; and
forming a fanning-array portion in the monolithic body comprising a plurality of optical waveguides extending from the phase modulation portion in a planar configuration and fanning so that ends of the plurality of optical waveguides terminate to define a two-dimensional array on an edge of the monolithic body.

17. The method of claim 16 wherein forming the optical signal portion, optical coupler/splitter portion, phase modulation portion, and fanning-array portion comprises forming at least one of the optical signal portion, optical coupler/splitter portion, phase modulation portion, and fanning-array portion using a femtosecond laser.

18. The method of claim 16 wherein the phase shifters comprise micro-heater elements.

19. The method of claim 16 wherein the phase shifters comprise Lithium Niobate electrodes.

20. The method of claim 16 wherein forming the phase modulation portion further comprises forming recesses between the phase shifters.

21. The method of claim 16 wherein forming the phase modulation portion further comprises forming recesses beneath the phase shifters.

22. An optical device comprising:
a monolithic body of optical material comprising
an optical signal port,
a phase modulation portion comprising a plurality of phase shifters arranged in a planar configuration,
a first fanning-array portion comprising a plurality of optical waveguides extending from a first end of the phase modulation portion in a planar configuration and fanning to a two-dimensional array on a first edge of the monolithic body; and
a second fanning-array portion comprising a plurality of optical waveguides extending from a second end of the phase modulation portion in a planar configuration and fanning to a two-dimensional array on a second edge of the monolithic body opposite the first edge.

23. The optical device of claim 22 wherein the phase shifters comprise micro-heater elements.

24. The optical device of claim 22 wherein the phase shifters comprise Lithium Niobate electrodes.

* * * * *